United States Patent
Nishimura

(10) Patent No.: US 7,362,476 B2
(45) Date of Patent: Apr. 22, 2008

(54) APPARATUS FOR CORRECTING SOLID-STATE ELECTRONIC IMAGE SENSING DEVICE

(75) Inventor: Toru Nishimura, Asaka (JP)

(73) Assignee: Fujifilm Corporation, Tokyo (JP)

(*) Notice: Subject to any disclaimer, the term of this patent is extended or adjusted under 35 U.S.C. 154(b) by 977 days.

(21) Appl. No.: 10/614,187

(22) Filed: Jul. 8, 2003

(65) Prior Publication Data

US 2004/0008389 A1    Jan. 15, 2004

(30) Foreign Application Priority Data

Jul. 11, 2002 (JP) .............................. 2002-202272

(51) Int. Cl.
*H04N 1/40* (2006.01)
*H04N 1/00* (2006.01)
*H04N 1/46* (2006.01)

(52) U.S. Cl. .................. 358/461; 358/406; 358/504; 358/513

(58) Field of Classification Search ............... 358/461, 358/406, 504, 513; 399/207; 382/274
See application file for complete search history.

(56) References Cited

U.S. PATENT DOCUMENTS 6,421,146 B1* 7/2002 Yoo .......................... 358/461
6,424,809 B1* 7/2002 Yamamoto et al. ......... 396/225
6,580,525 B1* 6/2003 Iwakiri et al. .............. 358/471
7,130,091 B2* 10/2006 Ishimaru et al. ............ 358/496

FOREIGN PATENT DOCUMENTS

| JP | 04-326267 | 11/1992 |
| JP | 05-030350 | 2/1993 |
| JP | 06-165775 | 6/1994 |
| JP | 08-005570 | 1/1996 |
| JP | 10-200796 A | 7/1998 |
| JP | 2000-132663 | 5/2000 |
| JP | 2001-094886 | 4/2001 |
| JP | 2002-112992 | 4/2002 |
| JP | 2002-320142 A | 10/2002 |

* cited by examiner

*Primary Examiner*—Houshang Safaipour
(74) *Attorney, Agent, or Firm*—Birch, Stewart, Kolasch & Birch, LLP

(57) ABSTRACT

A CCD is such that a single image sensing area is produced by performing exposure four times in four areas. Four correction circuits are provided in association with respective ones of the four areas. Four items of image data obtained based upon respective ones of the four areas are input to corresponding correction circuits, which apply a correction to prevent image disturbance at the area boundaries. One frame of image data is generated from corrected image data of respective ones of the areas and the image data is recorded on a memory card.

1 Claim, 4 Drawing Sheets

APPARATUS FOR CORRECTING SOLID-STATE ELECTRONIC IMAGE SENSING DEVICE

This nonprovisional application claims priority under 35 U.S.C. § 119(a) on Patent Application No(s). 2002-202272 filed in JAPAN on Jul. 11, 2002, which is (are) herein incorporated by reference.

BACKGROUND OF THE INVENTION

1. Field of the Invention

This invention relates to an apparatus for correcting a solid-state electronic image sensing device.

2. Description of the Related Art

A solid-state electronic image sensing device such as a CCD is created by placing a photomask on a silicon wafer and then exposing the wafer through the photomask. With creation techniques available at the present time, it is difficult to create a large-capacity solid-state electronic image sensing device, namely one having 20 to 30 M pixels, at one time. Usually, exposure is performed multiple times, i.e., in each of a plurality of different areas of the CCD.

Owing to the fact that exposure is performed multiple times, the level of a video signal when the signal is read out of the solid-state electronic image sensing device differs from one area to another.

SUMMARY OF THE INVENTION

Accordingly, an object of the present invention is to correct the level of a video signal that differs from area to area of a solid-state electronic image sensing device.

According to the present invention, the foregoing object is attained by providing an apparatus for correcting a solid-state electronic image sensing device, comprising: a solid-state electronic image sensing device, which is created by dividing an image sensing area into a plurality of areas, for outputting image data representing the image of a subject by sensing the image of the subject; a correction-value memory for storing correction values in association with respective ones of the plurality of areas of the solid-state electronic image sensing device; and an image-data correction unit for correcting image data, which is obtained based upon respective ones of the plurality of areas from among the image data that is output from the solid-state electronic image sensing device, using corresponding correction values from among the correction values stored in the correction-value memory.

The present invention also provides a control method suited to the above-described apparatus for correcting a solid-state electronic image sensing device. Specifically, the present invention provides a method of controlling an apparatus for correcting a solid-state electronic image sensing device, which is created by dividing an image sensing area into a plurality of areas, for outputting image data representing the image of a subject by sensing the image of the subject, the method comprising a step of correcting image data, which is obtained based upon respective ones of the plurality of areas from among the image data that is output from the solid-state electronic image sensing device, using corresponding correction values from among correction values that have been stored in association with respective ones of the plurality of areas of the solid-state electronic image sensing device.

In accordance with the present invention, correction values are stored in association with respective ones of a plurality of areas of a solid-state electronic image sensing device. Image data is output from the solid-state electronic image sensing device. Image data obtained based upon respective ones of the plurality of areas is corrected by corresponding correction values from among the correction values that have been stored in association with the plurality of areas.

The present invention makes it possible to correct the video-signal level that differs from area to area as a result of the solid-state electronic image sensing device having been created by performing exposure multiple times in on a per-area basis.

In a case where there are a plurality of the correction-value memories associated with respective ones of the plurality of areas, the apparatus would further comprise: a plurality of correction circuits corresponding to the plurality of correction-value memories; and a control unit for applying image data obtained based upon respective ones of the plurality of areas from among the image data output from the solid-state electronic image sensing device to corresponding correction circuits from among the plurality of correction circuits, and controlling the correction circuits so as to correct the image data using corresponding correction values from among the correction values that have been stored in the plurality of correction-value memories.

Further, the solid-state electronic image sensing device may include a solid-state electronic image sensing element, which is created by dividing an image sensing area into a plurality of areas, for outputting a video signal representing the image of a subject by sensing the image of the subject; and a plurality of analog/digital converting circuits provided in association with the plurality of areas for converting, to respective ones of items of image data, video signals obtained based upon respective ones of the plurality of areas from the video signal output from the solid-state electronic image sensing element.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

When a CCD is created, a photomask is placed on a silicon wafer and the wafer is exposed through the photomask. It is difficult to create a large-capacity CCD (e.g., one having 20 to 30 M pixels or more) at one time. Usually, exposure is performed in each of a number of different areas of the CCD, namely multiple times per CCD.

Figure 1:
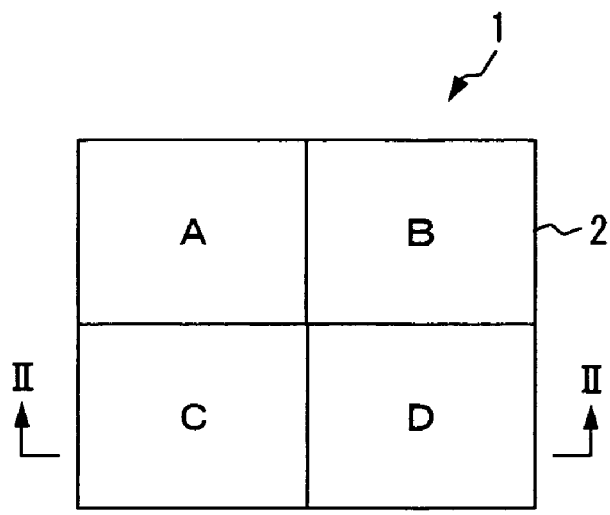
FIG. 1 is a diagram illustrating an image sensing area of a CCD.

FIG. 1 is a diagram illustrating the image sensing area of a large-capacity CCD.

As shown in FIG. 1, a large-capacity CCD 1 has an image sensing area 2 in which a plurality of areas A to D have been defined. The large-capacity CCD 1 is created by performing exposure in each of the plurality of areas A to D.

By forming the image of a subject on the image sensing area 2 of the large-capacity CCD 1 using an imaging lens or the like, a video signal representing the image of the subject is output by the CCD 1.

Figure 2:
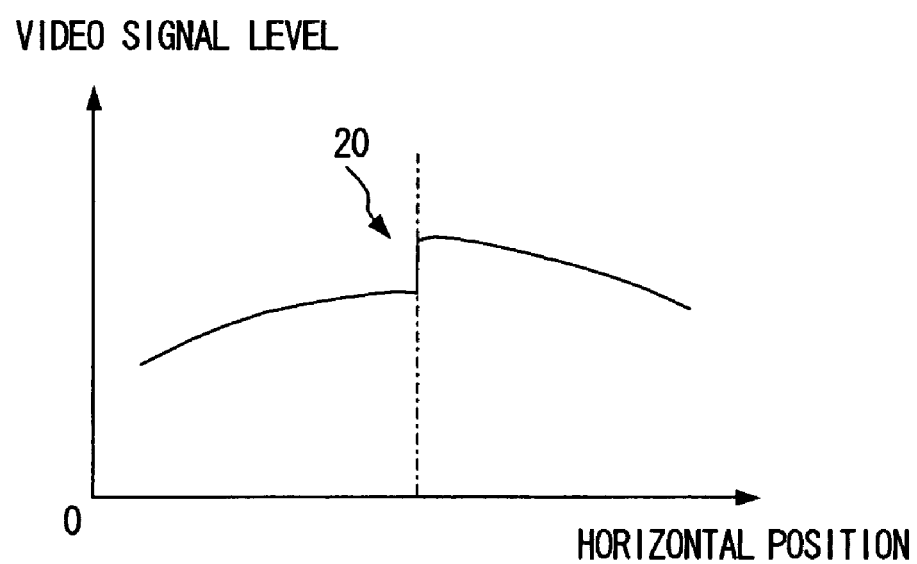
FIG. 2 is a graph illustrating a difference in level produced at a boundary between areas.

FIG. 2 is a graph illustrating the level of the video signal obtained from the image sensing area 2 along line II-II in FIG. 1.

If the large-capacity CCD 1 having the image sensing area 2 is created by performing exposure multiple times in each of the areas A to D, a difference in level or step 20 is produced in the video signal at the boundary between areas despite the fact that the levels of the video signal should coincide at the boundary.

A digital still camera according to this embodiment is so adapted that the difference in level produced at the boundary between areas is corrected.

Figure 3:
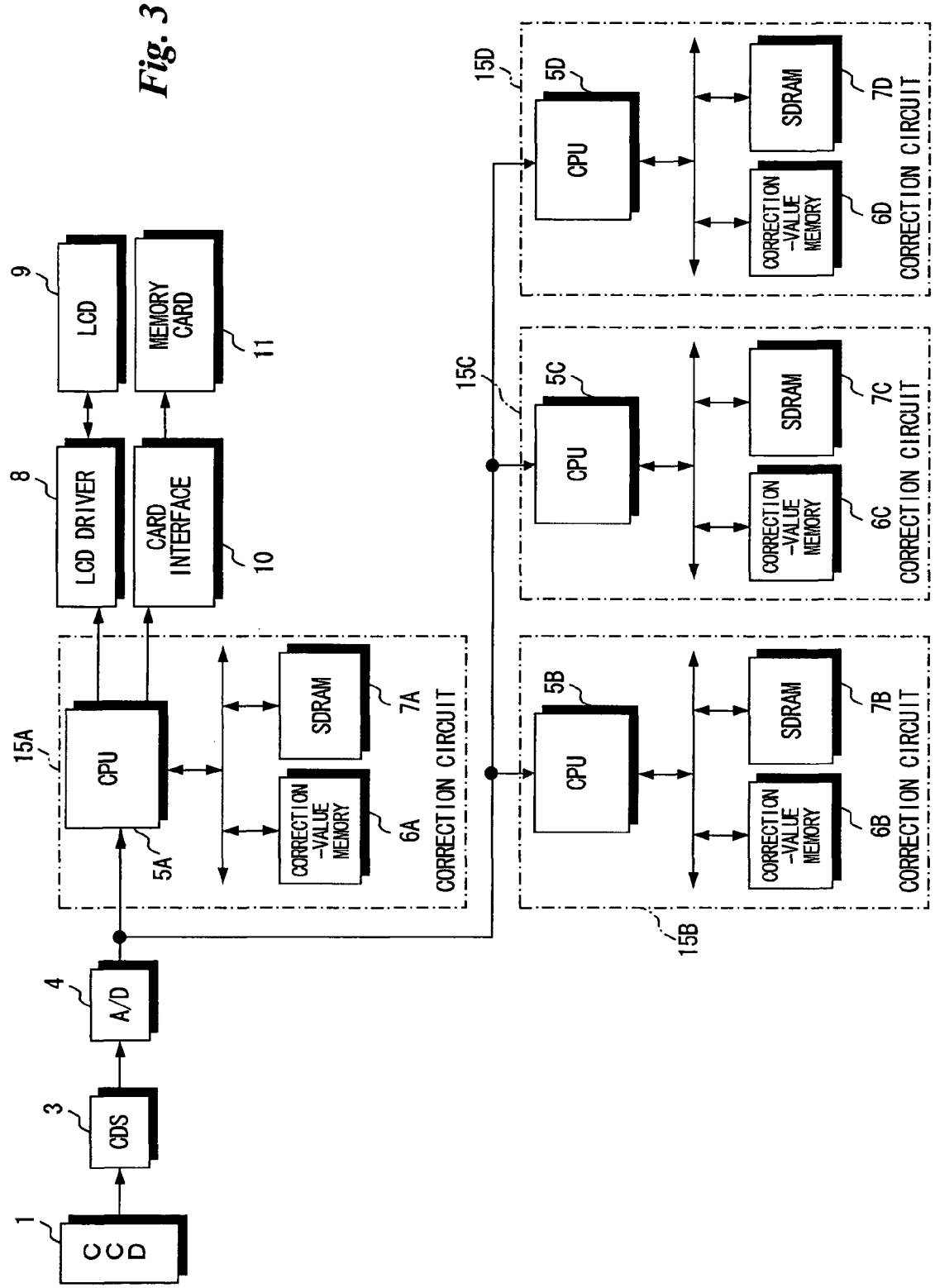
FIG. 3 is a block diagram illustrating the electrical structure of a digital still camera according to an embodiment of the present invention.

FIG. 3 is a block diagram illustrating the electrical structure of a digital still camera according to this embodiment.

As shown in FIG. 3, the digital still camera is provided with four, i.e., first to fourth, correction circuits 15A, 15B, 15C and 15D corresponding to the four areas A to D of the image sensing area 2 of CCD 1. The four correction circuits 15A, 15B, 15C and 15D correct the levels of the video signals output from respective ones of the areas A, B, C and D in image sensing area 2. The correction circuit 15A includes a CPU 5A, a correction-value memory 6A and an SDRAM 7A. Similarly, the correction circuit 15B includes a CPU 5B, a correction-value memory 6B and an SDRAM 7B, the correction circuit 15C includes a CPU 5C, a correction-value memory 6C and an SDRAM 7C, and the correction circuit 15D includes a CPU 5D, a correction-value memory 6D and an SDRAM 7D.

Data representing correction values for correcting the level difference of the video signals produced by the areas A, B, C and D in the manner described above is stored in the correction-value memories 6A, 6B, 6C and 6D in association with the areas A, B, C and D. Further, as will be described later, the CPUs 5A, 5B, 5C and 5D are so engineered as to store temporarily, in the SDRAMs 7A, 7B, 7C and 7D, image data output from the corresponding areas A, B, C and D from among the image data output from an analog/digital converting circuit 4.

When the image of a subject is sensed by the CCD 1, the video signal representing the image of the subject is output from the CCD 1. The video signal output from the CCD 1 is subjected to CDS (correlated double sampling) processing in a CDS circuit 3, whence the resultant analog video signal is applied to an analog/digital converting circuit 4. The latter converts the analog video signal to digital image data. The image data resulting from the conversion is applied to the CPUs 5A, 5B, 5C and 5D of the correction circuits 15A, 15B, 15C and 15D, respectively.

When image data based upon area A has been applied, the digital still camera is controlled by the CPU 5A so as to store this image data temporarily in the SDRAM 7A of correction circuit 15A. Similarly, control is such that when image data based upon area B has been applied, this image data is stored temporarily in the SDRAM 7B of correction circuit 15B; when image data based upon area C has been applied, this image data is stored temporarily in the SDRAM 7C of correction circuit 15C; and when image data based upon area D has been applied, this image data is stored temporarily in the SDRAM 7D of correction circuit 15D.

The image data that has been stored in the SDRAM 7A of first correction circuit 15A is read out by the CPU 5A and is corrected using the correction value for area A stored in the correction-value memory 6A. The corrected image is stored temporarily in the SDRAM 7A again. Similarly, image data that has been stored in the SDRAM 7B of the second correction circuit 15B is corrected using the correction value for area B and the corrected image data is stored in the SDRAM 7B; image data that has been stored in the SDRAM 7C of the third correction circuit 15C is corrected using the correction value for area C and the corrected image data is stored in the SDRAM 7C; and image data that has been stored in the SDRAM 7D of the fourth correction circuit 15D is corrected using the correction value for area D and the corrected image data is stored in the SDRAM 7D. Accordingly, image data representing the image obtained by correcting the image that was formed in area A is stored in SDRAM 7A of the first correction circuit 15A. Similarly, image data representing the images obtained by correcting the images that were formed in areas B, C and D is stored in SDRAM 7B of the second correction circuit 15B, SDRAM 7C of the third correction circuit 15C and SDRAM 7D of the fourth correction circuit 15D, respectively.

The image data representing the image obtained by correcting the image that was formed in area B, which image data has been stored in SDRAM 7B of the second correction circuit 15B, is read by the CPU 5B. The image data that has been read is stored in SDRAM 7A by the CPU 5A of the first correction circuit 15A. Similarly, image data representing the image obtained by correcting the image that was formed in area C, which image data has been stored in the third correction circuit 15C, and image data representing the image obtained by correcting the image that was formed in area D, which image data has been stored in the fourth correction circuit 15D, also is stored in SDRAM 7A of the first correction circuit 15A. Thus, one frame's worth of corrected image data is stored in SDRAM 7A of the first correction circuit 15A.

The one frame of image data is read out of SDRAM 7A of the first correction circuit 15A and is applied to an LCD (liquid crystal display) driver 8. An LCD 9 is driven by the LCD driver 8, whereby the image of the subject obtained by photography is displayed on the display screen of the LCD 9. Since a correction is applied in the manner described above, image disturbance at the area boundaries will not occur in the image being displayed on the display screen of the LCD 9.

If a shutter-release button (not shown) is pressed, the corrected image obtained as set forth above will be applied to and recorded on a memory card 11 via a card interface 10.

Figure 4:
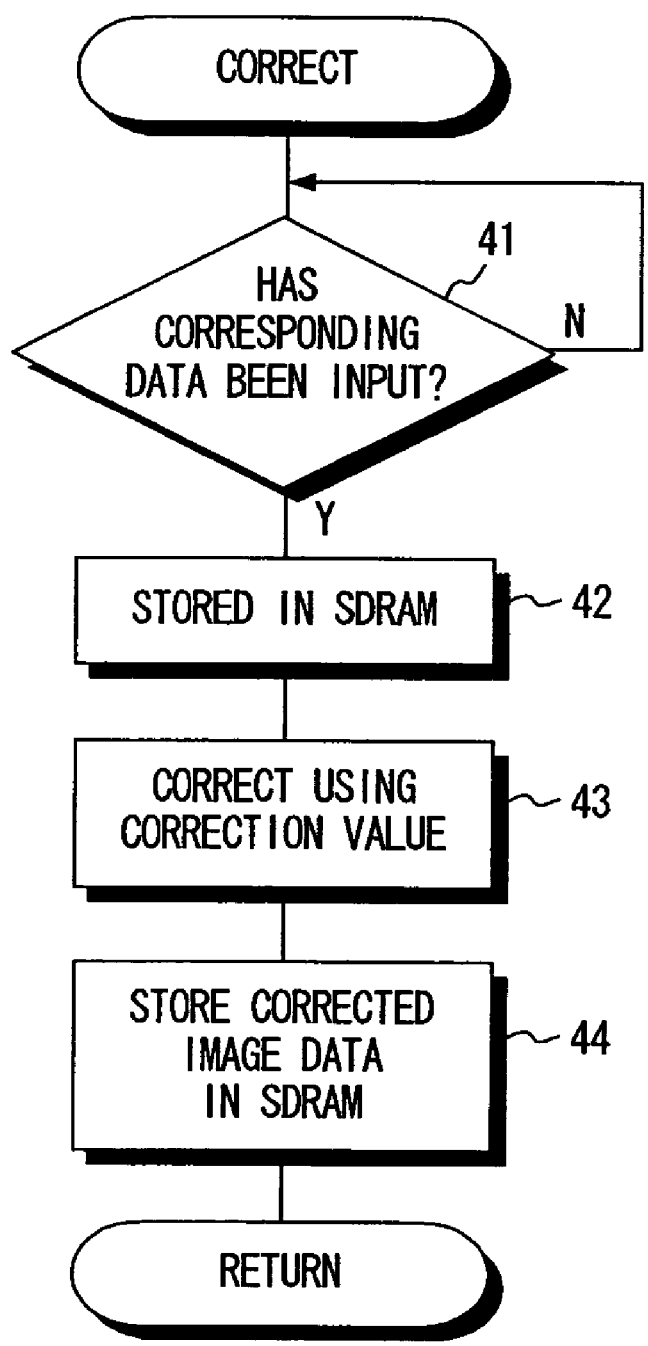
FIG. 4 is a flowchart illustrating correction processing according to this embodiment.

FIG. 4 is a flowchart illustrating correction processing.

If image data obtained from corresponding areas A through D is input to CPUs 5A to 5D from the first to fourth correction circuits 15A to 15D, respectively ("YES" at step 41), then the image data is stored in the SDRAMs 7A to 7D, respectively (step 42). The image data that has been stored in respective ones of the SDRAMs 7A to 7D is corrected using the correction values corresponding to the areas A to D and stored in the correction-value memories 6A to 6D (step 43). The corrected image data is stored in the SDRAMs 7A to 7D again (step 44).

This is followed by applying the image data, which has been stored in the SDRAMs 7B to 7D, to the SDRAM 7A in the first correction circuit 15A, as described above, whereby image data representing one frame of an image is generated. The corrected image is displayed on the LCD 9. Further, the corrected frame of image data is recorded on the memory card 11.

Figure 5:
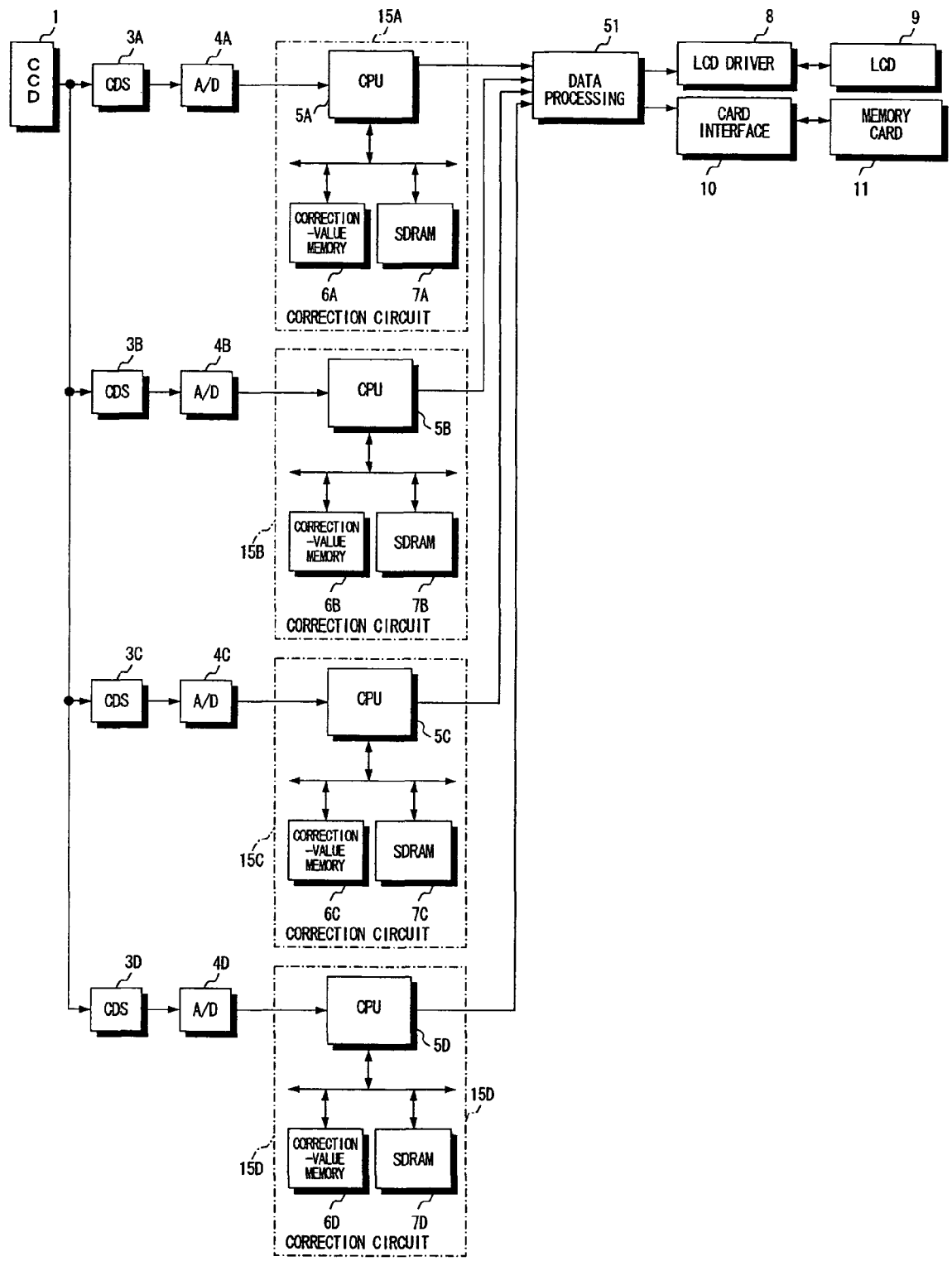
FIG. 5 is a block diagram illustrating the electrical structure of a digital still camera according to another embodiment of the present invention.

FIG. 5 is a block diagram illustrating the electrical structure of a digital still camera according to another embodiment of the present invention. Components in FIG. 5 identical with those shown in FIG. 3 are designated by like reference characters and need not be described again.

The digital still camera shown in FIG. 5 is provided with first to fourth CDS circuits 3A to 3D and first to fourth analog/digital converting circuits 4A to 4D corresponding to the first to fourth correction circuits 15A to 15D.

The video signal output from the CCD 1 is subjected to correlated double sampling processing in the first to fourth CDS circuits 3A to 3D, respectively. The video signal that has undergone correlated double sampling is converted to digital image data in the first to fourth analog/digital converting circuits 4A to 4D. The image data output from the first to fourth analog/digital converting circuits 4A to 4D is input to the first to fourth correction circuits 15A to 15D, respectively, where the data is corrected.

The corrected image data corresponding to areas A to D is input to a data processing circuit 51, where one frame of image data is generated. The image represented by the generated image data is displayed on the display screen of LCD 9 and the generated image data is recorded on the memory card 11 as in the manner described above.

Since the above-described correction processing is carried out even with a CCD 1 produced by performing exposure multiple times in areas A to D, image disturbance at the boundaries of the areas can be prevented.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for correcting a solid-state electronic image sensing device, comprising:

a solid-state electronic image sensing device, which is created by dividing an image sensing area into a plurality of areas, for outputting image data representing the image of a subject by sensing the image of the subject;

a correction-value memory for storing correction to values in association with respective ones of the plurality of areas of said solid-state electronic image sensing device; and an image-data correction unit for correcting image data, which is obtained based upon respective ones of the plurality of areas from among the image data that is output from said solid-state electronic image sensing device, using corresponding correction values from among the correction values stored in said correction-value memory, wherein a plurality of said correction-value memories are provided in association with respective ones of the plurality of areas, and said image data correction unit includes:

a plurality of correction circuits corresponding to the plurality of said correction-value memories; and a control unit for applying image data obtained based upon respective ones of the plurality of areas from among the image data output from said solid-state electronic image sensing device to corresponding correction circuits from among the plurality of correction circuits, and controlling said correction circuits so as to correct the image data using corresponding correction values from among the correction values that have been stored in said plurality of correction-value memories, wherein said solid-state electronic image sensing device includes:

a solid-state electronic image sensing element, which is created by dividing an image sensing area into a plurality of areas, for outputting a video signal representing the image of a subject by sensing the image of the subject; and a plurality of analog/digital converting circuits provided in association with the plurality of areas for converting, to respective ones of items of image data, video signals obtained based upon respective ones of the plurality of areas from the video signal output from said solid-state electronic image sensing element.

* * * * *